United States Patent
Natsuhara et al.

(10) Patent No.: US 12,413,140 B2
(45) Date of Patent: Sep. 9, 2025

(54) POWER CONVERTER AND CONTROL METHOD FOR POWER CONVERTER

(71) Applicant: Mitsubishi Electric Corporation, Tokyo (JP)

(72) Inventors: Hiroya Natsuhara, Tokyo (JP); Isao Kezobo, Tokyo (JP); Tatsuya Mori, Tokyo (JP); Chiaki Fujimoto, Tokyo (JP); Atsushi Ito, Kobe (JP); Yusuke Takarada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 18/269,339

(22) PCT Filed: Apr. 14, 2021

(86) PCT No.: PCT/JP2021/015384
§ 371 (c)(1),
(2) Date: Jun. 23, 2023

(87) PCT Pub. No.: WO2022/219733
PCT Pub. Date: Oct. 20, 2022

(65) Prior Publication Data
US 2024/0136915 A1     Apr. 25, 2024
US 2024/0235379 A9     Jul. 11, 2024

(51) Int. Cl.
*H02M 1/32* (2007.01)
*B62D 5/04* (2006.01)
(Continued)

(52) U.S. Cl.
CPC ......... *H02M 1/325* (2021.05); *H02M 1/0009* (2021.05); *H02M 1/084* (2013.01);
(Continued)

(58) Field of Classification Search
CPC ........ B62D 5/0487; H02M 1/32; H02M 7/48; H02M 7/5387
See application file for complete search history.

(56) References Cited

U.S. PATENT DOCUMENTS

| 2007/0127170 A1* | 6/2007 | Park ..................... H02H 7/1227 361/18 |
| 2010/0060222 A1* | 3/2010 | Kezobo .................. G01R 31/52 318/490 |

(Continued)

FOREIGN PATENT DOCUMENTS

| EP | 2 164 169 A1 | 3/2010 |
| EP | 2 540 594 A2 | 1/2013 |

(Continued)

OTHER PUBLICATIONS

Extended European Search Report issued Apr. 29, 2024 in Application No. 21936935.2.

*Primary Examiner* — Gary A Nash
(74) *Attorney, Agent, or Firm* — Sughrue Mion, PLLC

(57) ABSTRACT

A power converter includes: a multiphase inverter circuit including multiple switching elements; multiple current sensors each of which detects a current of a respective phase of the inverter circuit; a terminal voltage detector that detects a voltage of each terminal of a load connected to the inverter circuit; a switching element drive circuit that controls the switching elements according to a switching pattern given; a fault detector that detects a fault in the inverter circuit or the current sensors; and a fault identifier that, after the fault detector detects the fault, switches the switching pattern to be given to the switching element drive circuit according to types of faults detectable by the fault detector, and identifies a type and a location of the fault based on the value of the (Continued)

current detected or the value of the voltage detected during the control according to the switching pattern.

20 Claims, 9 Drawing Sheets

(51) Int. Cl.
    *H02M 1/00*         (2006.01)
    *H02M 1/084*       (2006.01)
    *H02M 7/48*         (2007.01)
    *H02M 7/537*       (2006.01)
    *H02M 7/5387*     (2007.01)

(52) U.S. Cl.
    CPC ........... *H02M 7/537* (2013.01); *B62D 5/0487* (2013.01); *H02M 1/32* (2013.01); *H02M 7/48* (2013.01); *H02M 7/5387* (2013.01)

(56) References Cited

U.S. PATENT DOCUMENTS

| | | | | |
|---|---|---|---|---|
| 2011/0248657 A1* | 10/2011 | Endoh | .................. | B62D 5/0487 |
| | | | | 318/400.22 |
| 2012/0181961 A1* | 7/2012 | Kono | ...................... | B60L 3/003 |
| | | | | 318/400.21 |
| 2018/0323613 A1 | 11/2018 | Fujimoto et al. | | |

FOREIGN PATENT DOCUMENTS

| | | | |
|---|---|---|---|
| JP | 4954278 | B2 | 6/2012 |
| JP | 5092538 | B2 | 12/2012 |
| JP | 6516878 | B2 | 5/2019 |

* cited by examiner

FIG. 3

| | | TYPES OF FAULTS | | | | | | |
|---|---|---|---|---|---|---|---|---|
| | | Short-circuit fault in switching element with short-circuit resistance value smaller than Ra | | Saturation fault in current sensor | Short-circuit fault in switching element with short-circuit resistance value equal to or larger than Ra | | Gain abnormality in current sensor | (Reference) In normal time |
| BEHAVIORS OF DETECTED VALUES | | Upper Fault | Lower Fault | | Upper Fault | Lower Fault | | |
| Detected voltage value | Faulty phase | LARGE | SMALL | NORMAL | LARGE | SMALL | NORMAL | NORMAL |
| | Three-phase average | LARGE | SMALL | NORMAL | LARGE | SMALL | NORMAL | NORMAL |
| Detected current value when lower switching elements are ON | Faulty phase absolute value | LARGE | NORMAL | LARGE (absolute value of upper and lower limits) | LARGE (equal to or less than rated current of element) | NORMAL | GAIN DEPENDENT | NORMAL |
| | Three-phase sum | NON-ZERO | 0 | NON-ZERO | NON-ZERO | 0 | NON-ZERO | 0 |
| Detected current value when upper switching elements are ON | Faulty phase absolute value | 0 | LARGE | LARGE (absolute value of upper and lower limits) | 0 | LARGE (equal to or less than rated current of element) | 0 | 0 |
| | Three-phase sum | 0 | NON-ZERO | NON-ZERO | 0 | NON-ZERO | 0 | 0 |

FIG. 4

| | TYPES OF DETECTABLE FAULTS | | | |
|---|---|---|---|---|
| | SHORT-CIRCUIT FAULT IN SWITCHING ELEMENT WITH SHORT CIRCUIT RESISTANCE VALUE SMALLER THAN Ra | SATURATION FAULT IN CURRENT SENSOR | SHORT-CIRCUIT FAULT IN SWITCHING ELEMENT WITH SHORT CIRCUIT RESISTANCE VALUE EQUAL TO OR LARGER THAN Ra | GAIN ABNORMALITY IN CURRENT SENSOR |
| FIRST FAULT DETECTION METHOD | DETECTABLE | | | |
| SECOND FAULT DETECTION METHOD | | DETECTABLE | | |
| THIRD FAULT DETECTION METHOD | | | DETECTABLE | |
| FOURTH FAULT DETECTION METHOD | DETECTABLE | DETECTABLE | DETECTABLE | DETECTABLE |
| FIFTH FAULT DETECTION METHOD | ... | ... | ... | DETECTABLE |
| ... | | | | ... |

FIG. 7

| | TYPES OF DETECTABLE FAULTS | | | |
|---|---|---|---|---|
| | SHORT-CIRCUIT FAULT IN SWITCHING ELEMENT WITH SHORT CIRCUIT RESISTANCE VALUE SMALLER THAN Ra | SATURATION FAULT IN CURRENT SENSOR | SHORT-CIRCUIT FAULT IN SWITCHING ELEMENT WITH SHORT CIRCUIT RESISTANCE VALUE EQUAL TO OR LARGER THAN Ra | GAIN ABNORMALITY IN CURRENT SENSOR |
| FAULT DETECTION METHOD a | DETECTABLE | DETECTABLE | DETECTABLE | |
| FAULT DETECTION METHOD b | | | DETECTABLE | DETECTABLE |
| FAULT DETECTION METHOD c | | | DETECTABLE | |

POWER CONVERTER AND CONTROL METHOD FOR POWER CONVERTER

TECHNICAL FIELD

The present disclosure relates to a power converter and a control method for the power converter.

This application is a U.S. National Stage Application of International Application No. PCT/JP2021/015384 filed on Apr. 14, 2021, the contents of which are incorporated herein by reference.

BACKGROUND ART

A technique of identifying a type and a location of a fault in a power converter has been disclosed. For example, Patent Document 1 discloses a technique of detecting an occurrence of a short-circuit fault in a switching element of an inverter circuit and thereafter identifying a location of the fault. Further, Patent Document 2 discloses a technique of detecting a short-circuit fault in a switching element of an inverter circuit or a fault in a current sensor that detects a current flowing through the inverter circuit and thereafter identifying a type and a location of the fault. Further, Patent Document 3 discloses a technique of detecting an occurrence of a fault in a current sensor that detects a current flowing through an inverter circuit and thereafter identifying a location of the fault.

By identifying a type and a location of a fault using such techniques as described in Patent Documents 1 to 3 described above, it becomes possible to stop driving only at the location where the fault has occurred, and continue an emergency operation at a normal location.

CITATION LIST

Patent Document

[Patent Document 1] Japanese Patent Publication No. 4954278
[Patent Document 2] Japanese Patent Publication No. 5092538
[Patent Document 3] Japanese Patent Publication No. 6516878

SUMMARY OF THE INVENTION

Problems to be Solved by the Invention

The method of identifying a location of a fault described in Patent Document 1 uses a switching pattern for turning off all of the switching elements of the inverter circuit, and thereafter uses a switching pattern for turning on the switching elements one by one, thereby identifying a location where a short-circuit fault in a switching element has occurred, using a value of a current sensor at the time when a through current occurs. When a short-circuit resistance value of the short-circuited switching element is small, however, a through current which occurs becomes a large current exceeding a rated current of the switching element, which may cause heat generation and further cause an occurrence of a fault. Further, the method of identifying a location of a fault according to Patent Document 1 relates to a short-circuit fault in a switching element, and cannot identify a location of a fault in a current sensor.

The method of identifying a type and a location of a fault described in Patent Document 2 uses a switching pattern for turning off all of the switching elements of the inverter circuit after detecting an abnormality such that a current value is excessive, and when a rotation speed of a motor connected as a load becomes lower than a specified value, identifies a short-circuit fault in a switching element if a terminal voltage of the motor becomes abnormal, and identifies a fault in a current sensor if the terminal voltage of the motor does not become abnormal. In this method, however, it is necessary to wait until the rotation speed of the motor becomes lower than the specified value in order to prevent an erroneous determination due to a back electromotive force of the motor. Further, even when the rotation speed of the motor is within the specified value, if the short-circuit resistance value of the short-circuited switching element is greater than a design condition for the specified value of the rotation speed of the motor, the terminal voltage of the motor will not become abnormal, so that there is a possibility that a short-circuit fault in a switching element will be erroneously determined to be a fault in a current sensor. Further, when the specified value of the rotation speed of the motor is made sufficiently small so as to prevent an erroneous determination, it takes a long time to wait until the rotation speed of the motor reaches the specified value, thereby making it impossible to identify a fault in a short time.

Further, the method of identifying a location of a fault described in Patent Document 3 uses a switching pattern for turning off all of the switching elements of the inverter circuit, and thereafter uses a switching pattern for driving the switching elements at a higher frequency than a rotation speed of an electric motor connected to the inverter circuit, thereby identifying a location of a fault in a current sensor based on a high-frequency component of a value detected by the current sensor. However, this method cannot identify a location of a fault in a switching element. Further, when a short-circuit fault occurs in a switching element, a through current may exceed a rated current of the switching element, as in the method described in Patent Document 1.

Here, if all of the methods described in Patent Documents 1 to 3 were executed to identify a type and a location of a fault, a time required to identify the fault would be longer than necessary, and moreover, depending on an execution order of fault identification processes, a through current may exceed a rated current of a switching element as described above.

The present disclosure has been made in view of the circumstances described above, and one of the purposes is to provide a power converter that accurately identifies faults in a short time while preventing an occurrence of large currents when identifying faults in an inverter circuit and a current sensor.

Means for Solving the Problems

A power converter according to the present disclosure includes: a multiphase inverter circuit including a plurality of switching elements; a plurality of current sensors each configured to detect a current of a respective phase of the inverter circuit and output a value of the current detected; a terminal voltage detector configured to detect a voltage of each terminal of a load connected to the inverter circuit and output a value of the voltage detected; a switching element drive circuit configured to control the plurality of switching elements of the inverter circuit according to a switching pattern given; a fault detector configured to detect a fault in the inverter circuit or the plurality of current sensors; and a fault identifier configured to, after the fault detector detects the fault, switch the switching pattern to be given to the switching element drive circuit according to types of faults detectable by the fault detector, and perform fault identification processing of identifying a type and a location of the fault in the inverter circuit or the plurality of current sensors based on the value of the current detected by at least one of the plurality of current sensors or the value of the voltage detected by the terminal voltage detector during the control according to the switching pattern.

A control method according to the present disclosure is for a power converter including a multiphase inverter circuit and a plurality of current sensors. The control method includes: detecting a current of a respective phase of the inverter circuit and outputting a value of the current detected; detecting a voltage of each terminal of a load connected to the inverter circuit and outputting a value of the voltage detected; controlling a plurality of switching elements of the inverter circuit according to a switching pattern given; detecting a fault in the inverter circuit or the plurality of current sensors; and after detecting the fault, switching the switching pattern to be given according to types of faults detectable, and performing fault identification processing of identifying a type and a location of the fault in the inverter circuit or the plurality of current sensors based on the value of the current detected or the value of the voltage detected during the control according to the switching pattern.

Effects of the Invention

According to the present disclosure, when identifying faults in the inverter circuit and the plurality of current sensors, it is possible to accurately identify the faults in a short time while preventing an occurrence of large currents.

BRIEF DESCRIPTION OF THE DRAWINGS

FIG. 3 is a diagram showing a list of behaviors of detected values when each fault occurs.

FIG. 4 is a diagram showing an example of fault detection methods according to the first embodiment.

FIG. 7 is a diagram showing an example of fault detection methods according to the second embodiment.

MODE FOR CARRYING OUT THE INVENTION

Hereinafter, embodiments will be described with reference to the drawings.

First Embodiment

Figure 1:
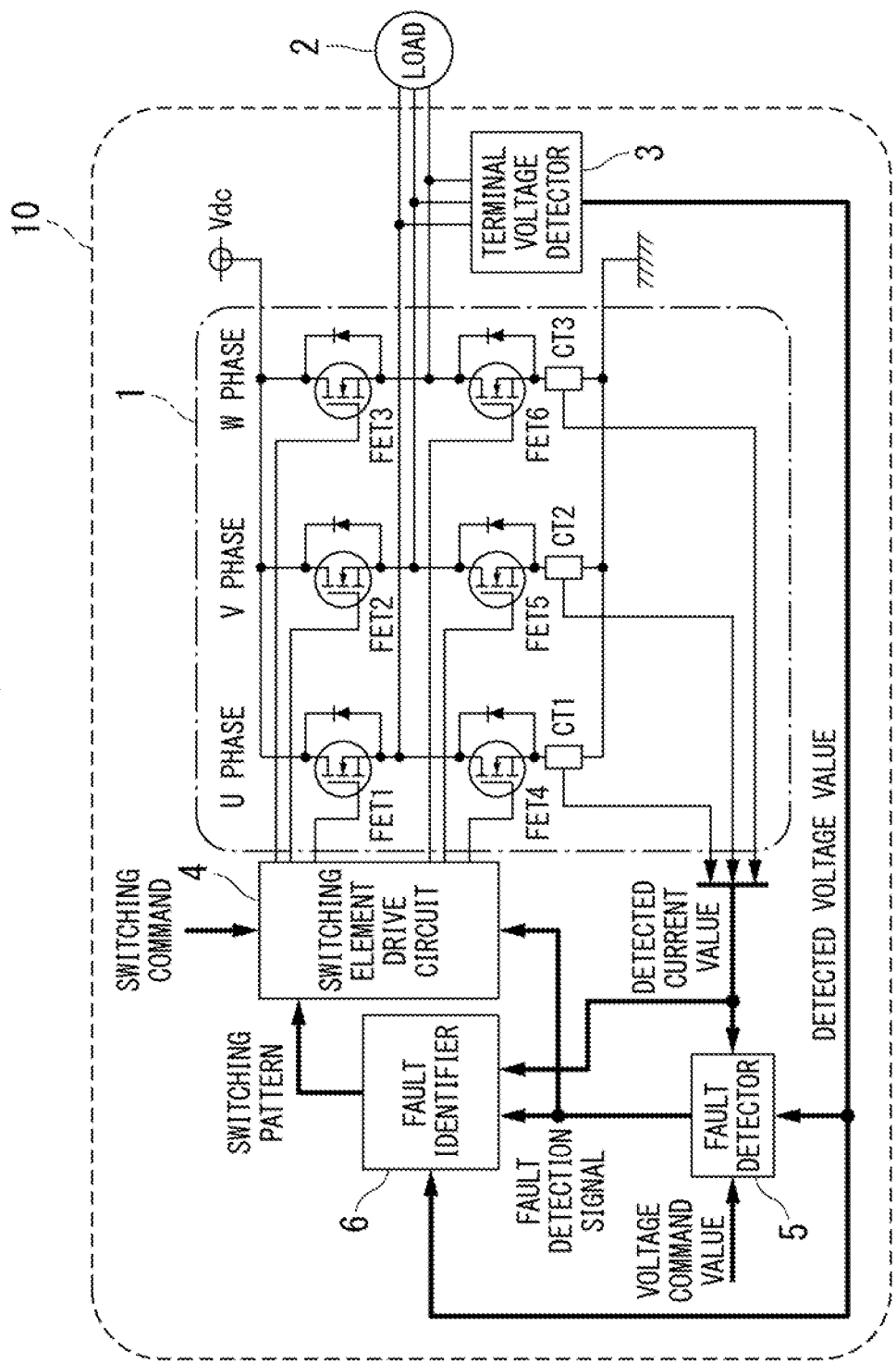
FIG. 1 is a block diagram showing an example of an overall configuration of a power converter according to a first embodiment.

First, a first embodiment will be described.
[Configuration of Power Converter]
FIG. 1 is a block diagram showing an example of an overall configuration of a power converter 10 according to the present embodiment. Note that the power converter 10 according to the present embodiment can be connected in use to a multiphase load 2, but for simplicity of explanation, a case where the load 2 is a three-phase brushless motor having a U-phase, a V-phase, and a W-phase will be described as an application example.

An inverter circuit 1 includes upper switching elements FET1, FET2, and FET3, lower switching elements FET4, FET5, and FET6, and current sensors CT1, CT2, and CT3, which are provided for the U-phase, the V-phase, and the W-phase, respectively. The current sensors CT1 to CT3 detect currents of the respective phases of the inverter circuit 1 and output values of the respective currents detected. The current sensors CT1 to CT3 are connected in series to the respective upper switching elements FET1 to FET3 or the respective lower switching elements FET4 to FET6. Hereinafter, as shown in FIG. 1, a configuration in which the current sensors CT1 to CT3 are connected respectively to the lower switching elements FET4 to FET6 will be described as an example.

A terminal voltage detector 3 detects terminal voltages of terminals of the respective phases of the load 2 and outputs values of the respective voltages detected.

A switching element drive circuit 4 commands the switching elements FET1 to FET6 included in the inverter circuit 1 to switch on or off based on an input of a switching pattern or a switching command to drive the load, which will be described later. As an input to the switching element drive circuit 4, the above-described switching command is used in a normal state with no fault, and a switching pattern output from a fault identifier 6, which will be described later, is used when a fault detection signal is output from a fault detector 5, which will be described later.

The fault detector 5 determines whether or not a fault is occurring in the switching elements FET1 to FET6 or the current sensors CT1 to CT3 included in the inverter circuit 1. When determining that a fault is occurring, the fault detector 5 outputs a fault detection signal. As a fault determination method by the fault detector 5, there is a method of monitoring values such as values of the currents detected by the current sensors CT1 to CT3, values of the voltages detected by the terminal voltage detector 3, a detected value of a rotation angle of the load 2, and a voltage command value to be applied as a command signal when driving the inverter circuit 1 during normal operation, or instead of monitoring these values themselves, monitoring a value obtained by performing four arithmetic operations on these values or the like, and determining a fault based on whether or not those values are abnormal. Alternatively, the fault determination method by the fault detector 5 may be a determination method using a fault detection function or the like, which is provided in hardware such as a microcomputer (microcomputer) or a driver that constitutes the switching element drive circuit 4 or a generator (not shown) that generates a voltage command value.

Examples of fault factors detectable by the fault detector 5 according to the present embodiment include short-circuit faults in the switching elements FET1 to FET6, upper and lower limit value stuck faults (saturation faults) in the current sensors CT1 to CT3, and gain abnormalities in the current sensors CT1 to CT3. A gain is an amplification factor of a detected current value with respect to an actual current which is an input signal.

The fault identifier 6 performs fault identification processing of outputting a switching pattern in response to a fault detection signal output from the fault detector 5, and identifying a fault based on a detected current value and a detected voltage value at the time when the switching pattern is output. Here, a series of operation patterns for turning on or off each of the switching elements FET1 to FET6 in order to identify a fault is referred to as "switching pattern(s)." In addition, identifying a type and a location of a fault is generally referred to as "identifying a fault," "identification of a fault," or the like. When the fault identifier 6 identifies a fault, it is possible to take a countermeasure such as stopping driving only at a location where the fault has occurred, and thereby continue an emergency operation at a normal location.

Note that FETs are used as the switching elements of the inverter circuit 1 in the configuration of the present embodiment, but any switching element device, which is turned on or off by a voltage command value of each phase to drive the load 2, can be applied. For example, thyristors, bipolar transistors, or the like may be used as the switching elements included in the inverter circuit 1. Further, shunt resistors are used as the current sensors CT1 to CT3 in the configuration of the present embodiment, but any sensor capable of detecting a current can be applied. For example, CTs (Current Transformers), Hall elements, or the like may be used as the current sensors CT1 to CT3.

Regarding the power converter 10 configured as described above, a behavior of a fault when a short-circuit fault in a switching element occurs at one location will be described.

Figure 2:
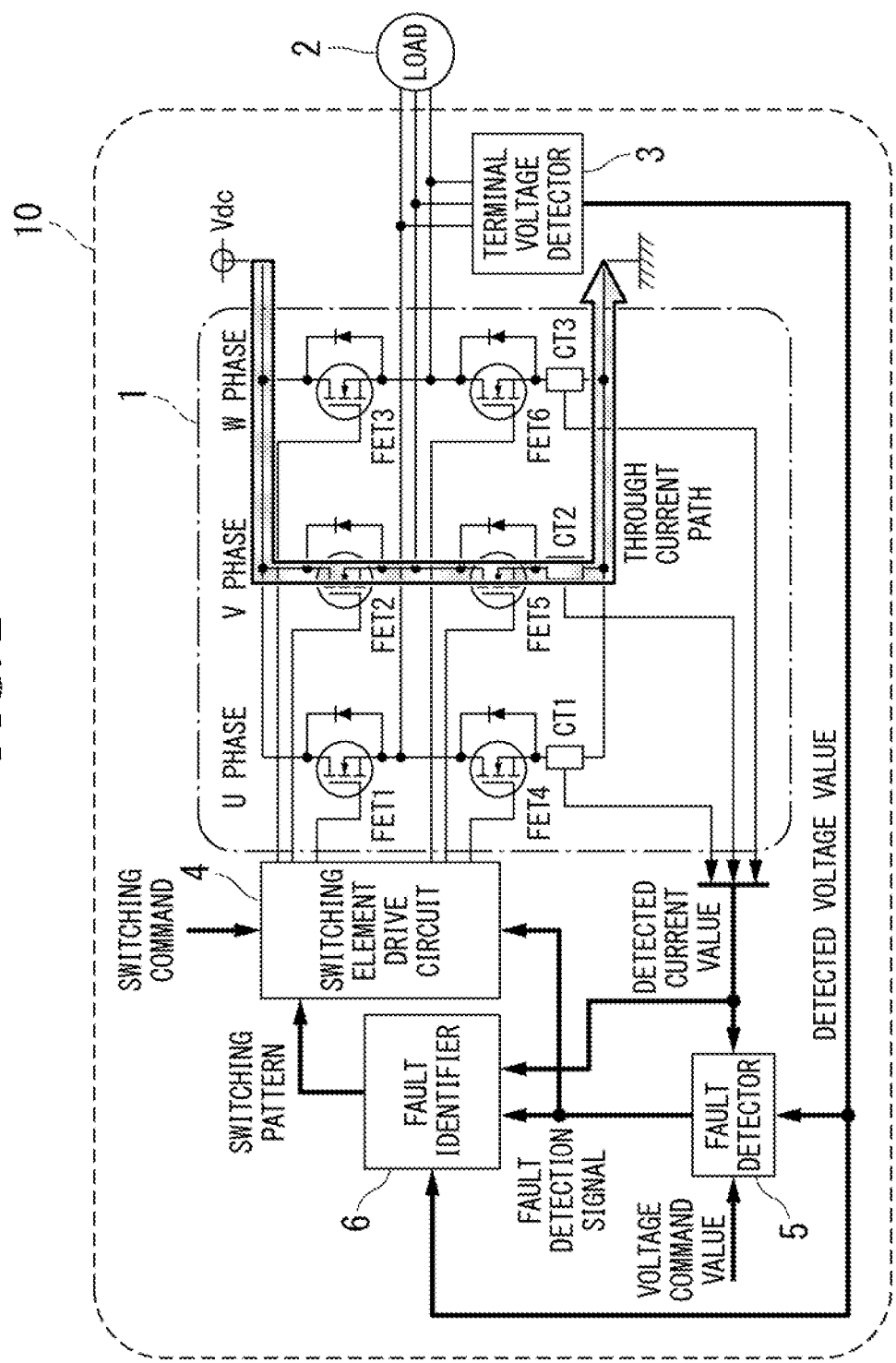
FIG. 2 is a diagram showing a path of a through current when a short-circuit fault occurs in a switching element.

FIG. 2 is a diagram showing a path of a through current when a short-circuit fault occurs in a switching element. Normally, the upper and lower switching elements of the same phase are controlled by the switching element drive circuit 4 so as not to be turned on at the same time. However, when a short circuit occurs in a switching element, in other words, when a fault occurs such that a switching element is always on, if the normal side switching element of the faulty phase is controlled to be turned on, the upper and lower switching elements of the faulty phase are turned on at the same time. At this time, as an example, when a short-circuit fault occurs in either the upper or lower switching element of the V phase, as indicated by a thick arrow in FIG. 2, a through current occurs in a path from a power supply (Vdc) to the ground via the upper and lower switching elements FET2 and FET5 of the V-phase which is the faulty phase, and the current sensor CT2. Assuming that a short-circuit resistance value of the short-circuited switching element is "R," a magnitude of the through current "I" can be expressed by the following equation (Formula 1).

$$I=Vdc/(R+R0) \quad \text{(Formula 1)}$$

"Vdc" in Formula 1 is a voltage of the power supply. Further, "R0" in Formula 1 is a sum of resistance values in the short-circuit path other than the short-circuited switching element, which includes the resistance of the normal side switching element connected in series to the short-circuited switching element, the resistance of the current sensor, the wiring resistance, and the like. As can be seen from Formula 1, the through current value I increases as the short-circuit resistance value R decreases. Allowing an excessive through current to flow leads to heat generation and faults in normal switching elements. Here, when a short-circuit resistance value at which the through current value I becomes equal to or less than a rated current value "I0" of the switching element is defined as "Ra," the short-circuit resistance value Ra can be expressed by the following equation (Formula 2).

$$Ra \geq Vdc/I0-R0 \quad \text{(Formula 2)}$$

In a case of a short-circuit fault for a short-circuit resistance value Ra that satisfies Formula 2, even if a through current flows when the short-circuit fault occurs in a switching element, a magnitude of the through current is equal to or less than the rated current value I0 of the switching element, so that a fault in a normal switching element can be suppressed. Therefore, in the present embodiment, using the short-circuit resistance value Ra as a threshold value, the fault identifier 6 switches fault identification processing, based on whether or not a fault detection method by which the fault detector 5 detects a fault can detect a fault for a short-circuit resistance value smaller than Ra. Here, it is recommended that the short-circuit resistance value Ra be set to be larger than the equal sign value of Formula 2 in consideration of the safety factor against variations in the resistance value R0 or the voltage Vdc of Formula 2.

FIG. 3 is a diagram showing a list of behaviors of detected values when each fault occurs. This list shows correspondence relationships between behaviors of detected values and types of faults. However, a behavior of a detected voltage value of a faulty phase with respect to a short-circuit fault in a switching element, and a behavior of a faulty phase absolute value of a detected current value when lower switching elements are on, are limited to cases where the influence of induced power due to the load 2 can be ignored.

Among the behaviors of detected values, the behavior of the "detected voltage value" of both the "faulty phase" and the "three-phase average" is "large" for an upper fault and "small" for a lower fault with respect to a short-circuit fault in a switching element, and takes a normal value with respect to a fault in a current sensor (saturation fault, gain abnormality, etc.). "Large" means that the voltage value is high. "Small" means that the voltage value is low. According to these behaviors of detected values, it is possible to detect both a short-circuit fault in a switching element with a short-circuit resistance value smaller than Ra and a short-circuit fault in a switching element with a short-circuit resistance value equal to or larger than Ra, depending on a setting of the fault determination threshold.

Among the behaviors of detected values, the "detected current value when lower switching elements are on" is a value of each of the current sensors CT1 to CT3 detected when the lower switching elements are on. Specifically, the "faulty phase absolute value," which indicates a faulty phase absolute value of the "detected current value when lower switching elements are on," is used to determine a fault based on an absolute value of a current of each phase flowing through a respective one of the current sensors CT1 to CT3. This "faulty phase absolute value" indicates an abnormal value with respect to a short-circuit fault in an upper switching element and a fault in a current sensor (saturation fault, gain abnormality, etc.). On the other hand, the "three-phase sum" of the "detected current value when lower switching elements are on" becomes "0" when the currents flowing through the current sensors CT1 to CT3 are correctly energized, in a case where the load 2 is a three-phase three-wire system, and if it does not become "0," it is determined to be abnormal. This makes it possible to detect a short-circuit fault in an upper switching element and a gain abnormality in a current sensor. Here, as shown in FIG. 1, since the current sensors CT1 to CT3 are connected in series to the respective lower switching elements, a fault in a lower switching element cannot be detected based on the "detected current value when lower switching elements are on."

Among the behaviors of detected values, the "detected current value when upper switching elements are on" is a value of each of the current sensors CT1 to CT3 detected when the upper switching elements are on. If there is no fault in the inverter circuit 1 or the current sensors CT1 to CT3, it becomes "0." If this value is not "0," it means that a short-circuit fault in a lower switching element or a saturation fault in a current sensor is occurring.

Thus, the "types of faults" can be identified according to the "behaviors of detected values" shown in FIG. 3. Therefore, the fault detector 5 can detect a fault according to the "behaviors of detected values," and at that time, can also narrow down candidates for the types of faults. Performed in the present embodiment is fault identification processing of identifying a fault using any one of the "first fault detection method" to the "fifth fault detection method" shown in FIG. 4, according to the "behaviors of detected values."

FIG. 4 is a diagram showing an example of fault detection methods provided in the fault detector 5 according to the present embodiment. This figure shows a correspondence relationship between each fault detection method and types of detectable faults. The fault detector 5 is provided with one or more fault detection methods. Although it is sufficient that the fault detector 5 is provided with only one type of fault detection method, the fault detector 5 may be provided with a plurality of fault detection methods for the purpose of detecting various types of faults, shortening the time required for fault detection, or reliably performing fault detection. Here, an example of five types of fault detection methods is shown, but the types of fault detection methods are not limited to five types, and may be less than or more than five types.

For each fault detection method, detectable fault factors are determined by fault detection settings such as types of values used for fault detection, determination conditions thereof, and establishment time conditions that define a time during which a determination condition is kept satisfied. Further, by setting strict fault detection conditions, such as using a logical product of a plurality of determination conditions, it is also possible to detect only a target type of fault. Each of the first to fifth fault detection methods shown in FIG. 4 will be described below.

(First Fault Detection Method)

Regarding the "detected voltage value" of both the "faulty phase" and the "3-phase average" among the behaviors of detected values in FIG. 3, a short-circuit fault in a switching element can be detected, regardless of a short-circuit resistance value. Here, by setting a fault determination threshold to be too large or too small, it becomes possible to detect only a fault for a small short-circuit resistance value. A fault detection method using the "detected voltage value," in which a fault determination threshold value is set so as to determine a fault for a short-circuit resistance value smaller than Ra, corresponds to the "first fault detection method" shown in FIG. 4.

(Third Fault Detection Method)

Regarding the "detected voltage value" of both the "faulty phase" and the "3-phase average" among the behaviors of detected values in FIG. 3, by setting a fault determination threshold, it becomes possible to detect only a fault for a large short-circuit resistance value, contrary to the first fault detection method. A fault detection method using the "detected voltage value," in which a fault determination threshold value is set so as to determine a fault for a short-circuit resistance value equal to or larger than Ra, corresponds to the "third fault detection method" shown in FIG. 4.

(Second Fault Detection Method and Fourth Fault Detection Method)

Regarding the "detected current value when lower switching elements are on" among the behaviors of detected values in FIG. 3, it is possible to detect an abnormality with respect to a fault in a current sensor (saturation fault, gain abnormality, etc.), but which cannot be distinguished from a short-circuit fault in a switching element. Therefore, it is used together with the "detected voltage value" shown in FIG. 3. Since only a short-circuit fault in a switching element can be detected using the "detected voltage value," it can be distinguished from a fault in a current sensor (saturation fault, gain abnormality, etc.), if a determination condition is that the "detected current value when lower switching elements are on" is "abnormal" and the "detected voltage value" is "normal." Therefore, the "second fault detection method" or the "fourth fault detection method" of detecting a fault in a current sensor shown in FIG. 4 can be realized using both the "detected voltage value" and the "detected current value when lower switching elements are on" shown in FIG. 3. Further, the "second fault detection method" is a method of detecting a saturation fault in a current sensor. On the other hand, the "fourth fault detection method" is a method of detecting a gain abnormality in a current sensor. To distinguish the two methods from each other, the "faulty phase absolute value" of the "detected current value when upper switching elements are on" shown in FIG. 3 is used. A distinction can be made such that the "second fault detection method" is used if the "faulty phase absolute value" of the "detected current value when upper switching elements are on" matches (is stuck to) an absolute value of upper and lower limits of the detected current value, while the "fourth fault detection method" is used if the "faulty phase absolute value" of the "detected current value when upper switching elements are on" is "0."

(Fifth Fault Detection Method)

Regarding the "fifth fault detection method" shown in FIG. 4, it is possible to detect all of the faults shown in FIG. 4 by setting a condition such that any one or more of the behaviors of detected values in FIG. 3 indicate abnormalities.

Thus, using the first to fourth fault detection methods, it is possible to distinguishably detect the four types of faults: a short-circuit fault for a short-circuit resistance value smaller than Ra, a short-circuit fault for a short-circuit resistance value equal to or larger than Ra, a saturation fault in a current sensor, and a gain abnormality in a current sensor. On the other hand, it is impossible in principle to determine, by the fifth fault detection method, which type of fault is detected when a fault is detected. Further, a faulty phase cannot be identified by any fault detection method using only a value with no phase information such as a sum or average value of the three phases as a fault detection determination condition. For simplification of explanation, the present embodiment will be described assuming that a faulty phase cannot be identified by the first to fifth fault detection methods. A mode of identifying a faulty phase when a fault is detected will be described later in a second embodiment. For the reasons described above, there are cases where a type and a location of a fault cannot be identified only by fault detection by the fault detector 5, and it is necessary to use fault identification processing by the fault identifier 6 to identify the fault.

Figure 5:
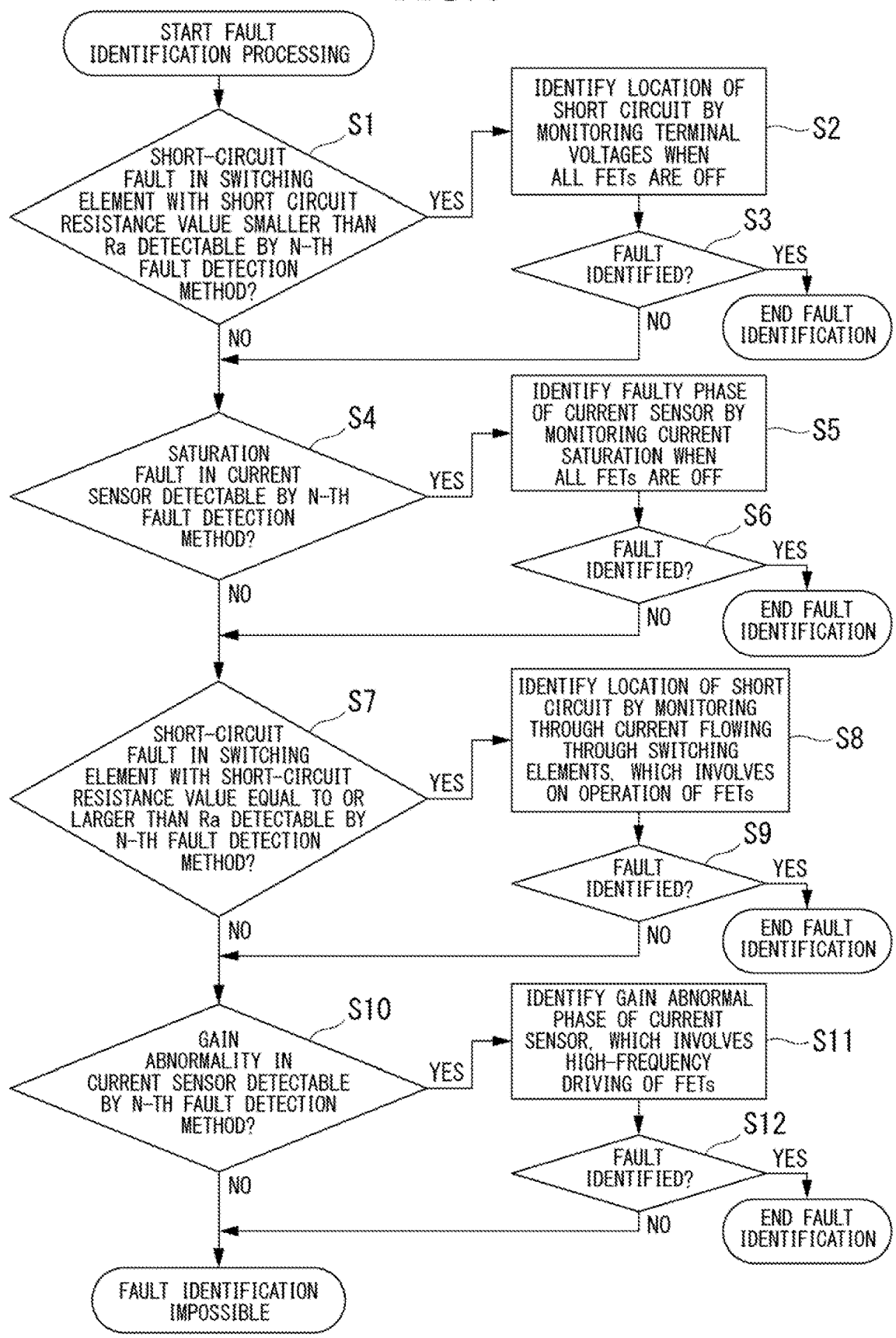
FIG. 5 is a flowchart showing an example of fault identification processing according to the first embodiment.

FIG. 5 is a flowchart showing an example of fault identification processing by the fault identifier 6 according to the present embodiment. Among the plurality of fault detection methods provided in the fault detector 5, a fault detection method by which a fault has been detected is referred to as an N-th fault detection method (N is an integer of 1 to 5 in this example). An operation of the fault identification processing by the fault identifier 6 to be performed after the fault detection by the N-th fault detection method will be described.

First, the fault identifier 6 determines whether or not a short-circuit fault in a switching element with a short circuit resistance value smaller than Ra is detectable by the N-th fault detection method (step S1). In the example of the present embodiment, the fault identifier 6 determines that a short-circuit fault in a switching element with a short-circuit resistance value smaller than Ra is detectable when the first fault detection method or the fifth fault detection method is used (step S1: YES).

When the determination in step S1 is YES, the fault identifier 6 performs a process of identifying a location of the short circuit by monitoring terminal voltages of the switching elements FET1 to FET6 when all FETs are off (step S2). This identification process includes controlling the switching elements FET1 to FET6 according to a first switching pattern for turning off all of the switching elements, and monitoring detected voltage values at that time. As a configuration of this identification process, for example, the method disclosed in Japanese Patent No. 5092538 or the like may be used. After performing the process in step S2, the fault identifier 6 determines whether a fault has been identified (step S3). When determining that a fault has been identified (step S3: YES), the fault identifier 6 ends the fault identification processing.

On the other hand, when the determination in step S1 or step S3 is NO, the fault identifier 6 determines whether or not a saturation fault in a current sensor is detectable by the N-th fault detection method (step S4). In the example of the present embodiment, the fault identifier 6 determines that a saturation fault in a current sensor is detectable when the second fault detection method or the fifth fault detection method is used (step S4: YES).

When the determination in step S4 is YES, the fault identifier 6 performs a process of identifying a faulty phase of a current sensor by monitoring current saturation when all of the switching elements FET1 to FET6 are off (step S5). This identification process includes controlling the switching elements FET1 to FET6 according to the first switching pattern for turning off all of the switching elements, and monitoring detected current values at that time. As a configuration of this identification process, for example, the method disclosed in Japanese Patent No. 5092538 or the like may be used. After performing the process in step S5, the fault identifier 6 determines whether a fault has been identified (step S6). When determining that a fault has been identified (step S6: YES), the fault identifier 6 ends the fault identification processing.

On the other hand, when the determination in step S4 or step S6 is NO, the fault identifier 6 determines whether or not a short-circuit fault in a switching element with a short-circuit resistance value equal to or larger than Ra is detectable by the N-th fault detection method (step S7). In the example of the present embodiment, when the third fault detection method or the fifth fault detection method is used, the fault identifier 6 determines that a short-circuit fault in a switching element with a short-circuit resistance value equal to or larger than Ra is detectable (step S7: YES).

When the determination in step S7 is YES, the fault identifier 6 performs a process of identifying a location of the short circuit by monitoring a through current flowing through switching elements, which involves the on-operation of the switching elements FET1 to FET6 (step S8). This identification process includes controlling the switching elements FET1 to FET6 according to a second switching pattern for turning on one or more switching elements, and monitoring detected current values at that time. As a configuration of this identification process, for example, the method disclosed in Japanese Patent No. 4954278 or the like may be used. Here, while the switching pattern disclosed in Japanese Patent No. 4954278 is a pattern for turning on the switching elements one by one, a second switching pattern for turning on the upper or lower switching elements of all phases at the same time may also be used. The latter switching pattern has an effect of shortening a time required for the fault identification process in step S8. After performing the process in step S8, the fault identifier 6 determines whether a fault has been identified (step S9). When determining that a fault has been identified (step S9: YES), the fault identifier 6 ends the fault identification processing.

On the other hand, when the determination in step S7 or step S9 is NO, the fault identifier 6 determines whether or not a gain abnormality in a current sensor is detectable by the N-th fault detection method (step S10). In the example of the present embodiment, the fault identifier 6 determines that a gain abnormality in a current sensor is detectable when the fourth fault detection method or the fifth fault detection method is used (step S10: YES).

When the determination in step S10 is YES, the fault identifier 6 performs a process of identifying a gain abnormal phase of a current sensor, which involves high-frequency driving of the switching elements FET1 to FET6 (step S11). This identification process includes controlling the switching elements FET1 to FET6 according to a third switching pattern for driving one or more switching elements at a frequency higher than the rotation speed of the load 2, and monitoring detected current values at that time. As a configuration of this identification process, for example, the method disclosed in Japanese Patent No. 6516878 or the like may be used. After performing the process in step S11, the fault identifier 6 determines whether or not a fault has been identified (step S12). When determining that a fault has been identified (step S12: YES), the fault identifier 6 ends the fault identification processing. On the other hand, when the determination in step S10 or step S12 is NO, the fault identifier 6 ends the fault identification processing assuming that a fault cannot be identified.

Here, in order for the fault identifier 6 to make determinations in steps S1, S4, S7, and S10, it is necessary to grasp in advance the correspondence relationship between each fault detection method and types of detectable faults shown in FIG. 4. Methods of grasping the correspondence relationship include a method of theoretically deriving it from a conditional expression of each fault detection method, and a method of performing verification by simulation or experiment. Further, in the flowchart of the fault identification processing by the fault identifier 6 shown in FIG. 5, a part of the processing, which is unnecessary under a condition, may be removed. For example, if there is no possibility that a fault related to a current sensor will occur, the processes in steps S4 to S6 and the processes in steps S10 to S12 are not necessary, so that the flowchart of the fault identification processing may bypass, without performing, those processes.

As described above, the power converter 10 according to the present embodiment includes: the multiphase inverter circuit 1 including the plurality of switching elements FET1 to FET6; the current sensors CT1 to CT3 each configured to detect a current of a respective phase of the inverter circuit 1 and output a value of the current detected; the terminal voltage detector 3 configured to detect a voltage of each terminal of the load 2 connected to the inverter circuit 1 and output a value of the voltage detected; and the switching element drive circuit 4 configured to control the plurality of switching elements FET1 to FET6 of the inverter circuit 1 according to a switching pattern given. Further, the power converter 10 includes: the fault detector 5 configured to detect a fault in the inverter circuit 1 or the current sensors CT1-CT3; and the fault identifier 6 configured to, after the fault detector 5 detects the fault, perform fault identification processing of identifying a type and a location of the fault in the inverter circuit 1 or the current sensors CT1-CT3. For example, the fault identifier 6 is configured to, after the fault detector 5 detects the fault, switch the switching pattern to be given to the switching element drive circuit 4 according to types of faults detectable by the fault detector 5, and perform fault identification processing of identifying a type and a location of the fault in the inverter circuit 1 or the current sensors CT1-CT3 based on the value of the current detected by at least one of the current sensors CT1 to CT3 or the value of the voltage detected by the terminal voltage detector 3 during the control according to the switching pattern.

As a result, the power converter 10 performs fault identification processing using a fault identification method necessary and sufficient for identifying a fault according to the types of faults detectable by the fault detector 5, so that it is possible to perform the fault identification processing while shortening the time required to identify the fault and preventing fault identification errors and large currents during the fault identification processing. Therefore, when identifying a fault in the inverter circuit 1 and the current sensors CT1 to CT3, the power converter 10 can accurately identify the fault in a short time while preventing an occurrence of a large current.

For example, the fault identifier 6 is configured to give to the switching element drive circuit 4, as the above-described switching pattern, a first switching pattern for turning off all of the switching elements FET1 to FET6, and a second switching pattern for turning on one or more of the plurality of switching elements.

As a result, the power converter 10 has two types of methods, which are a method that does not allow a through current to flow through the switching elements, and a method that allows a through current to flow, and by using the first switching pattern for turning off all of the switching elements FET1 to FET6, which corresponds to the method that does not allow a through current to flow, can prevent a large current from flowing when a short-circuit fault in a switching element with a small short-circuit resistance value occurs. Further, by using the second switching pattern for turning on one or more switching elements, the power converter 10 can identify a fault using a through current, and prevent an erroneous determination of fault identification when a short-circuit fault in a switching element with a large short-circuit resistance value occurs.

Further, for example, the fault identifier 6 is configured to give to the switching element drive circuit 4, as the above-described switching pattern, a first switching pattern for turning off all of the switching elements FET1 to FET6, a second switching pattern for simultaneously turning on the upper or lower switching elements of all phases among the plurality of switching elements, and a third switching pattern for driving one or more of the plurality of switching elements at a frequency higher than a rotation frequency of the load 2.

As a result, the power converter 10 uses the second switching pattern for simultaneously turning on the upper switching elements FET1 to FET3 or the lower switching elements FET4 to FET6 of all phases, thereby achieving an effect of shortening the time required for the fault identification processing. Further, by adding the third switching pattern, it becomes possible to identify a fault such as a gain abnormality in the current sensors CT1 to CT3, which cannot be identified by the first switching pattern or the second switching pattern.

Further, the fault detector 5 is configured to detect a fault using a first fault detection method that can detect a short-circuit fault in a switching element with a short-circuit resistance smaller than a predetermined threshold value (short-circuit resistance value Ra). Then, the fault identifier 6 is configured to, after the fault detector 5 detects the fault using the first fault detection method, perform the fault identification processing using the value of the voltage detected during the control according to the first switching pattern.

As a result, when a short-circuit fault occurs in the switching element with the short-circuit resistance smaller than the predetermined threshold value (short-circuit resistance value Ra), the power converter 10 can identify the fault.

Further, the fault detector 5 is configured to detect a fault using a second fault detection method that can detect an upper and lower limit value stuck fault (saturation fault) in the current sensors CT1 to CT3. Then, the fault identifier 6 is configured to, after the fault detector 5 detects the fault using the second fault detection method, perform the fault identification processing using the value of the current detected during the control according to the first switching pattern.

As a result, when a saturation fault occurs in the current sensors CT1 to CT3, the power converter 10 can identify the fault.

Further, the fault detector 5 is configured to detect a fault using a third fault detection method that can detect a short-circuit fault in a switching element with a short-circuit resistance equal to or larger than a predetermined threshold value (short-circuit resistance value Ra). Then, the fault identifier 6 is configured to, after the fault detector detects the fault using the third fault detection method, perform the fault identification processing using the value of the current detected during the control according to the second switching pattern.

As a result, when a short-circuit fault occurs in the switching element with the short-circuit resistance equal to or larger than the predetermined threshold value (short-circuit resistance value Ra), the power converter 10 can identify the fault.

Further, the fault detector 5 is configured to detect a fault using a fourth fault detection method that can detect a gain abnormality in the current sensors CT1-CT3. Then, the fault identifier 6 is configured to, after the fault detector 5 detects the fault using the fourth fault detection method, perform the fault identification processing using the value of the current detected during the control according to the third switching pattern.

As a result, when a fault occurs due to a gain abnormality in the current sensors CT1 to CT3, the power converter 10 can identify the fault.

Further, the fault detector 5 is configured to detect a fault using a fifth fault detection method that can detect a plurality of types of faults including a short-circuit fault in a switching element with a short-circuit resistance smaller than a predetermined threshold value (short-circuit resistance value Ra). Then, the fault identifier 6 is configured to, after the fault detector 5 detects the fault using the fifth fault detection method, before performing a switching pattern involving an on-operation of one or more of the plurality of switching elements, perform the fault identification processing using the value of the voltage detected during the control according to the first switching pattern.

As a result, when a fault occurs, the power converter 10 can identify the fault while preventing a large current and an erroneous determination of the fault identification when identifying the fault.

The above-described predetermined threshold value is defined as the short-circuit resistance value Ra of the switching element such that an amount of a through current is equal to or less than a rated current of the switching element, wherein the through current flows when a positive electrode and a negative electrode of a power supply (Vdc) of the inverter circuit 1 are short-circuited via upper and lower switching elements of a short-circuit faulty phase.

As a result, the power converter 10 can prevent a through current exceeding the rated current of the switching element from flowing when a fault is identified.

Second Embodiment

Next, a second embodiment will be described.

Figure 6:
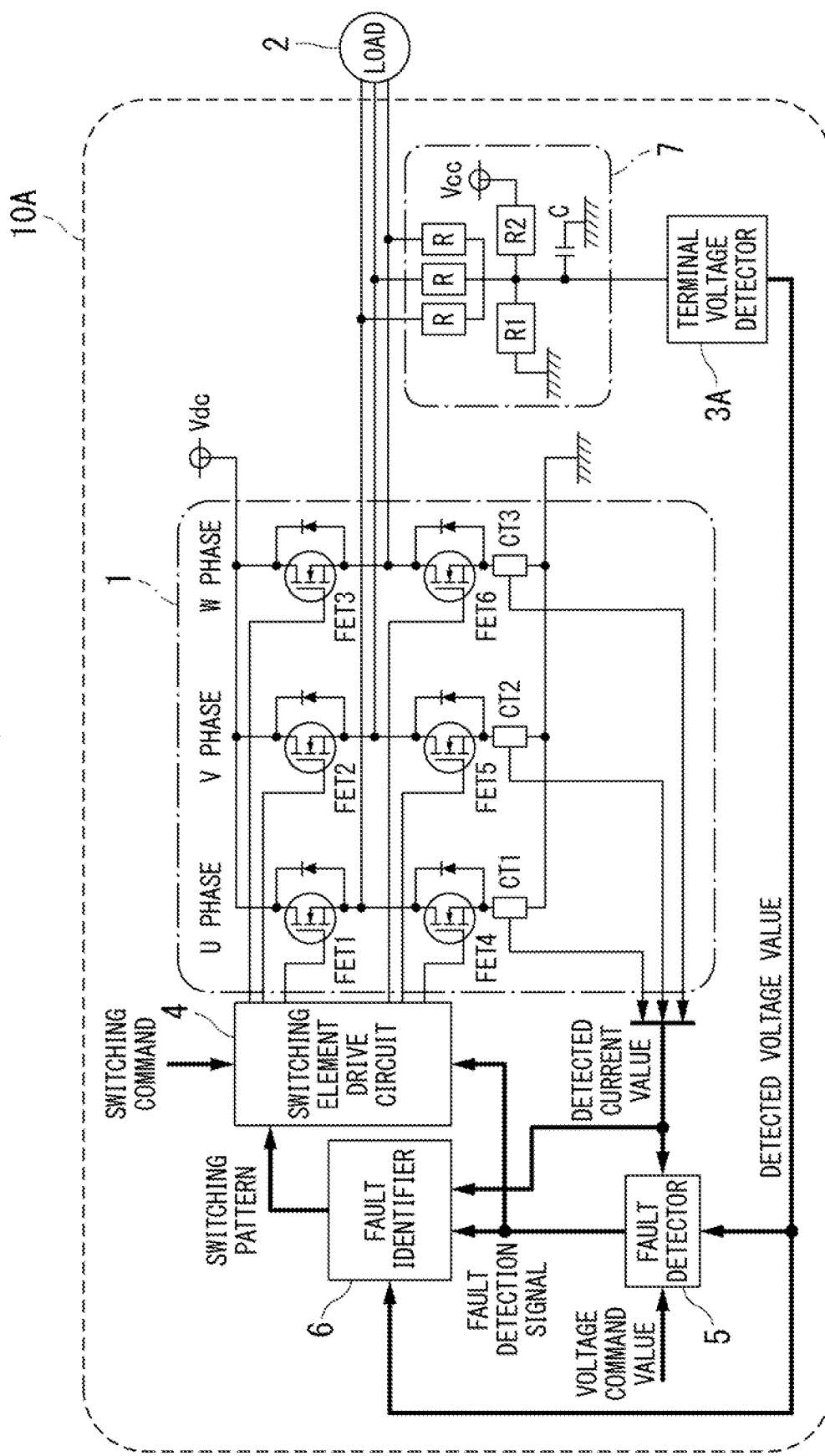
FIG. 6 is a block diagram showing an example of an overall configuration of a power converter according to a second embodiment.

FIG. 6 is a block diagram showing an example of an overall configuration of a power converter 10A according to the present embodiment. The terminal voltage detector 3 according to the first embodiment has the configuration capable of independently detecting voltage values of the three respective phases of the load 2. On the other hand, a terminal voltage detector 3A of the power converter 10A according to the present embodiment obtains via a voltage averaging circuit 7, an average voltage of the three phases of the load 2 as a detected voltage value, which is a difference from the first embodiment. With this configuration, there is a cost reduction effect due to the simplification of the components used. However, in order to identify a fault using such a three-phase average voltage as a detected voltage value, it is necessary to combine it with another method that can identify a faulty phase.

FIG. 7 is a diagram showing an example of fault detection methods provided in the fault detector 5 according to the present embodiment. This figure shows a correspondence relationship between each fault detection method and types of detectable faults. Here, three types of fault detection methods, which are a fault detection method a, a fault detection method b, and a fault detection method c, are shown. Each fault detection method can detect one or more types of faults.

The fault detection method a uses a fault detection function of detecting an overcurrent for each phase, which is installed in a microcomputer that constitutes the switching element drive circuit 4 or the like, or uses a determination condition that an absolute value of a detected current value for each phase is too larger or too smaller than a specified voltage. As a result, the fault detection method a can detect a short-circuit fault in a switching element with a short-circuit resistance value smaller than Ra, a short-circuit fault in a switching element with a short-circuit resistance value equal to or larger than Ra, and a saturation fault in a current sensor, and can also identify a faulty phase when a fault is detected.

The fault detection method b uses a determination condition that the "three-phase sum" of the "detected current value when lower switching elements are on" is "non-zero," and sets an establishment time condition longer than that of the fault detection method a. As a result, it is possible to detect a short-circuit fault in a switching element with a short-circuit resistance value equal to or larger than Ra and a fault in a gain abnormality in a current sensor, but is impossible to identify a faulty phase when a fault is detected.

The fault detection method c uses a determination condition that the "three-phase sum" of the "detected current value when upper switching elements are on" is "non-zero," and sets an establishment time condition longer than that of the fault detection method a. As a result, it is possible to detect a short-circuit fault in a switching element with a short-circuit resistance value equal to or larger than Ra, but is impossible to identify a faulty phase when a fault is detected.

Here, the fault detection method a sets an establishment time condition shorter than those of the fault detection method b and the fault detection method c, so that a short-circuit fault in a switching element with a short-circuit resistance value smaller than Ra and a saturation fault in a current sensor are detected by the fault detection method a capable of identifying a phase.

Figure 8:
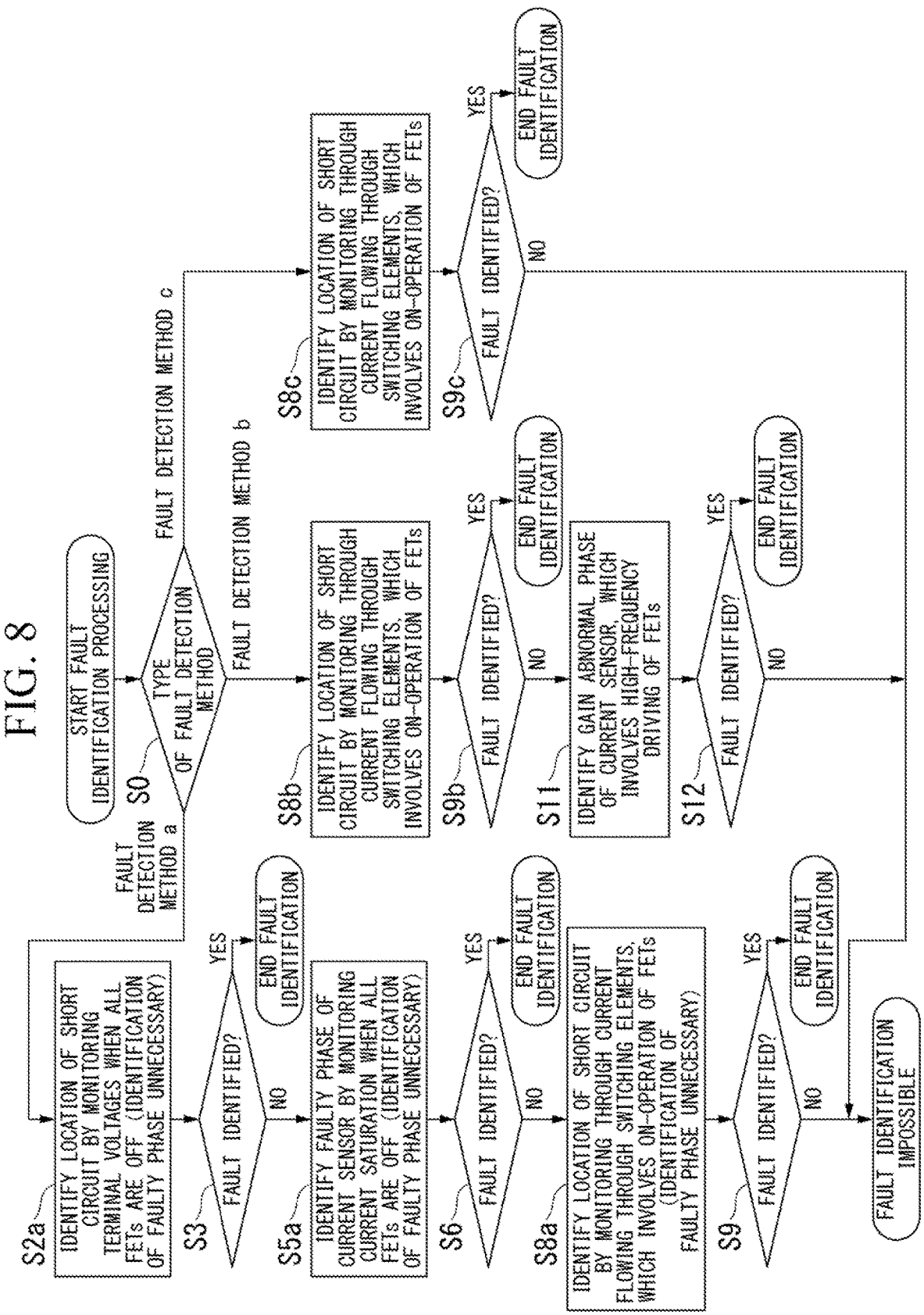
FIG. 8 is a flowchart showing an example of fault identification processing according to the second embodiment.

FIG. 8 is a flowchart showing an example of fault identification processing by the fault identifier 6 according to the present embodiment. In FIG. 8, the same reference numerals are given to processes corresponding to the respective processes in FIG. 5, and the description thereof will be omitted. As a difference from the first embodiment, the fault identification processing shown in FIG. 8 includes step S0 for branching according to a type of a fault detection method. In step S0, the fault identifier 6 branches to step S2a when a type of a fault detection method is the fault detection method a, branches to step S8b when a type of a fault detection method is the fault detection method b, and branches to step S8c when a type of a fault detection method is the fault detection method c. As a result, the determinations in steps S1, S4, S7, and S10 in the fault identification processing shown in FIG. 5 of the first embodiment become unnecessary, thereby enabling simplification of the program.

Further, each fault identification process can be adjusted and changed to suit each fault detection method. For example, in a case of the fault detection method a, a faulty phase has already been identified when a fault has been detected. Therefore, it is not necessary to identify a faulty phase in the fault identification processes in steps S2a, S5a, and S8a, and the fault identification processes can be simplified as compared to steps S2, S5, and S8 in FIG. 5.

In step S2a, the fault identifier 6 performs a process of identifying a location of a short circuit by monitoring terminal voltages when all of the switching elements FET1 to FET6 are off. In the configuration of the present embodiment, it is impossible to identify a faulty phase using detected voltage values. Since the faulty phase is already known in the case of the fault detection by the fault detection method a, however, a faulty phase need not be detected in step S2a.

After performing the process in step S2a, the fault identifier 6 determines whether a fault has been identified (step S3). When determining that a fault has been identified (step S3: YES), the fault identifier 6 ends the fault identification processing. On the other hand, when the determination in step S3 is NO, the fault identifier 6 proceeds to the process in step S5a.

In step S5a, the fault identifier 6 performs a process of identifying a faulty phase of a current sensor by monitoring current saturation when all of the switching elements FET1 to FET6 are off. Since the faulty phase is already known in the case of the fault detection by the fault detection method a, it is not necessary to identify a faulty phase in step S5a. Since it is sufficient to identify a fault only for the faulty phase, it is possible to shorten a time required to identify a fault.

After performing the process in step S5a, the fault identifier 6 determines whether a fault has been identified (step S6). When determining that a fault has been identified (step S6: YES), the fault identifier 6 ends the fault identification processing. On the other hand, when the determination in step S6 is NO, the fault identifier 6 proceeds to the process in step S8a.

In step S8a, the fault identifier 6 performs a process of identifying a location of a short circuit by monitoring a through current flowing through the switching elements, which involves the on-operation of the switching elements FET1 to FET6. Since the faulty phase is already known in the case of the fault detection by the fault detection method a, it is not necessary to identify a faulty phase in step S8a. In step S8a, the fault identifier 6 can shorten a time required to identify a fault because the on-operation of the switching elements is required only for the faulty phase.

After performing the process in step S8a, the fault identifier 6 determines whether a fault has been identified (step S9). When determining that a fault has been identified (step S9: YES), the fault identifier 6 ends the fault identification processing. On the other hand, when the determination in step S9 is NO, the fault identifier 6 ends the fault identification processing assuming that a fault cannot be identified.

Here, also in the case of performing the process in step S11 in FIG. 5 of identifying a gain abnormal phase of a current sensor, which involves high-frequency driving of the switching elements FET1 to FET6, although not included in the example shown in FIG. 8, if a faulty phase is known, identification of a fault is required only for the faulty phase, thereby enabling simplification of the fault identification processing.

Further, the processes in steps S8b, S9b, S11, and S12 performed in a case of the fault detection method b are the same as the processes in steps S8, S9, S11, and S12 in FIG. 5, and the description thereof will be omitted. Further, the processes in steps S8c and S9c performed in a case of the fault detection method c are the same as the processes in steps S8 and S9 in FIG. 5, and the description thereof will be omitted. Here, when the determination in step S9c is NO, the fault identifier 6 ends the fault identification processing assuming that a fault cannot be identified.

As described above, the power converter 10A according to the present embodiment can identify a fault even with the configuration in which the terminal voltage detector 3 acquires via the voltage averaging circuit 7, a three-phase average voltage of the load 2 as a detected voltage value, and there is a cost reduction effect due to the simplification of the components used. Further, the power converter 10A is provided with the step S0 branching according to a type of a fault detection method, as in the flowchart of the fault identification processing shown in FIG. 8, thereby achieving an effect that each fault identification process can be adjusted and changed to suit each fault detection method.

Further, when a faulty phase has already been identified when a fault has been detected, the power converter 10A does not need to identify a faulty phase in the fault identification processing, thereby making it possible to simplify the fault identification processing and shorten a time required to identify a fault.

Third Embodiment

Next, a third embodiment will be described. In the present embodiment, an example in which a motor is used as the load 2 shown in FIGS. 1 and 6 and applied to an electric power steering system for an automobile will be described.

Figure 9:
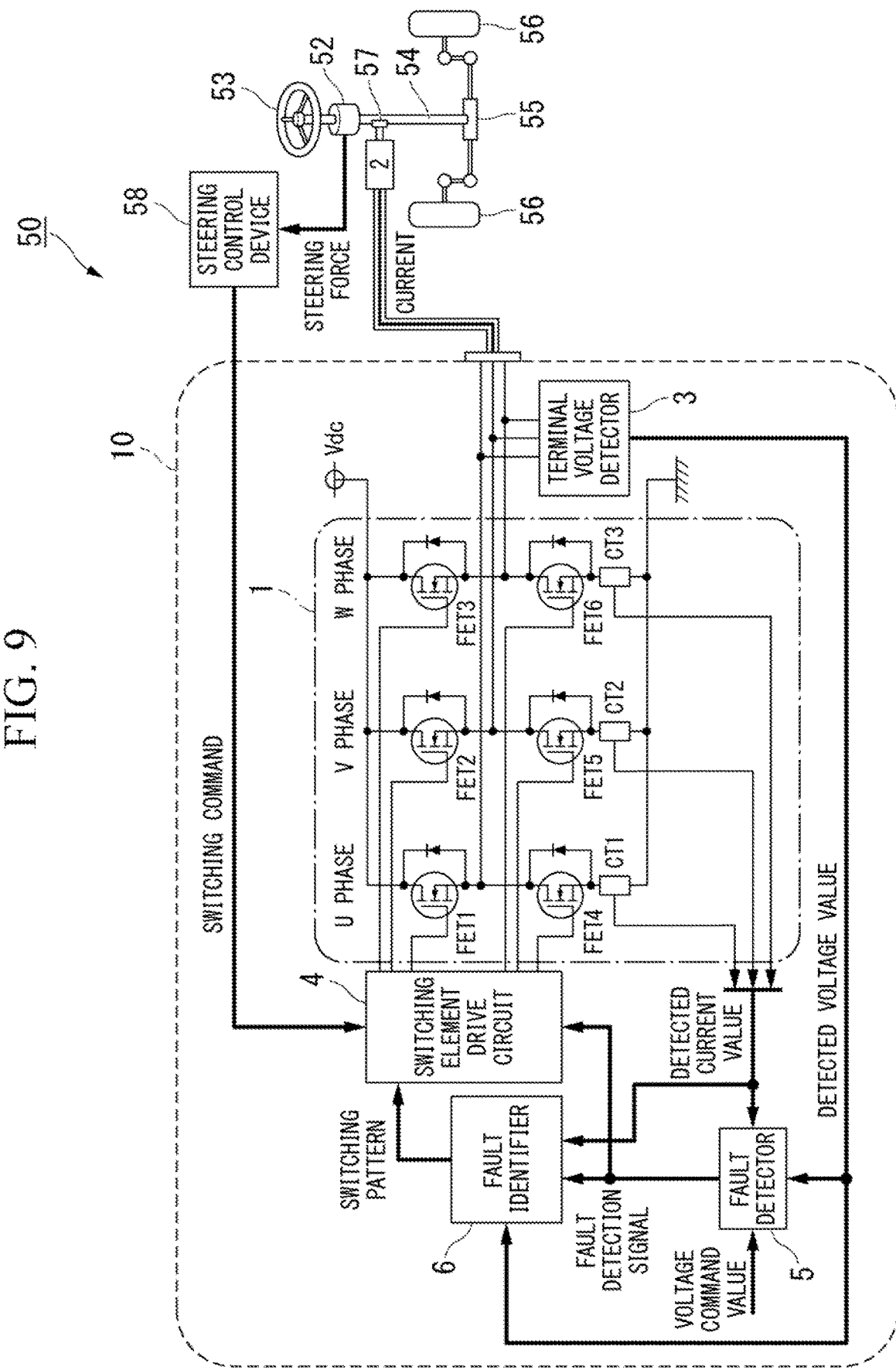
FIG. 9 is a block diagram showing an example of an overall configuration of an electric power steering system according to a third embodiment.

FIG. 9 is a block diagram showing an example of an overall configuration of an electric power steering system 50 according to the present embodiment. The electric power steering system 50 includes the load 2 (motor), a torque sensor 52, a steering wheel 53, a steering shaft 54, a rack and pinion gear 55, wheels 56, a reduction gear 57, a steering control device 58, and the power converter 10. Note that FIG. 9 shows an example in which the load 2, which is a motor, is connected to the power converter 10 shown in FIG. 1, but the load 2, which is the motor, may be connected to the power converter 10A shown in FIG. 6. Here, portions different from those of FIGS. 1 and 6 will be described.

A steering force applied by a driver (not shown) to the steering wheel 53 passes through the steering shaft 54 and is transmitted to a rack via the rack and pinion gear 55 to steer the wheels 56. The motor, which is the load 2, is connected to the steering shaft 54 via the reduction gear 57. A torque generated by the motor, which is the load 2, is transmitted to the steering shaft 54 via the reduction gear 57 to reduce the steering force applied by the driver during steering. The torque sensor 52 detects the steering force applied to the steering shaft 54 by the driver steering the steering wheel 53.

The steering control device 58 receives the steering force detected by the torque sensor 52 and outputs a switching command. In a normal state where a fault detection signal is not output from the fault detector 5, the switching element drive circuit 4 uses a switching command output from the steering control device 58 as an input value to supply a current from the inverter circuit 1 to the motor, which is the load 2. On the other hand, when a fault detection signal is output from the fault detector 5, the switching element drive circuit 4 uses a switching pattern output from the fault identifier 6 as an input value.

In the electric power steering system 50, if a control is stopped when an abnormality occurs while a vehicle is running, a driver will feel a great sense of discomfort, so that it is required to continue the control as much as possible. It is desirable to identify a location of a fault in order to continue the control as good as possible in spite of any abnormality. Furthermore, it is desirable to identify a fault in a short period of time in order to quickly shift to a control corresponding to the abnormal state after the occurrence of the abnormality. According to the electric power steering system 50 according to the present embodiment, it is possible to accurately identify a fault in a very short time, so that it is possible to shift to the control corresponding to the abnormal state quickly and without error, thereby making it possible to reduce the discomfort felt by the driver.

As described above, each embodiment has been described in detail with reference to the drawings, but the specific configuration is not limited to these embodiments, and each embodiment may be combined, modified, or omitted as appropriate.

Note that the power converter 10 (10A) described above may have a computer system therein. Then, a program for realizing the functions of the fault detector 5 and the fault identifier 6 provided in the power converter 10 (10A) may be recorded in a computer-readable recording medium, so that a computer system can read and execute the program recorded in the recording medium to perform the processing of the fault detector 5 and the fault identifier 6. Here, the "computer system" referred to here includes an OS and hardware such as peripheral devices.

Further, the "computer-readable recording medium" refers to portable media such as flexible disks, magneto-optical disks, ROMs and CD-ROMs, and storage devices such as hard disks built into computer systems. Further, the "computer-readable recording medium" includes: a medium that dynamically retains a program for a short period of time, like a communication line in a case where the program is transmitted via a network such as the Internet or a communication line such as a telephone line; and a medium that retains a program for a certain period of time, such as a volatile memory inside a computer system that serves as a server or a client in the above case. Further, the above-described program may be one for realizing part of the functions described above, or may be one capable of realizing the functions described above in combination with a program already recorded in the computer system. Further, the above-described program may be stored in a predetermined server, so that it will be distributed (downloaded, or the like) via a communication line in response to a request from another device.

Further, part or all of the functions of the fault detector 5 and the fault identifier 6 may be implemented as an integrated circuit such as an LSI (Large Scale Integration). Each function may be individually processorized, and part or all of the functions may be integrated and processorized. Further, the integrated circuit is not limited to an LSI, and may be implemented as a dedicated circuit or a general-purpose processor. Further, when an integrated circuit technology that replaces the LSI appears due to advances in semiconductor technology, an integrated circuit based on that technology may be used.

DESCRIPTION OF REFERENCE NUMERALS

1: inverter circuit, 2: load, 3: terminal voltage detector, 4: switching element drive circuit, 5: fault detector, 6: fault identifier, 7: voltage averaging circuit, 10: power converter, FET1 to FET6: switching element, CT1 to CT3: current sensor, 50: electric power steering system, 52: torque sensor, 53: steering wheel, 54: steering shaft, 55: rack and pinion gear, 56: wheel, 57: reduction gear, 58: steering control device

The invention claimed is:

1. A power converter comprising:
a multiphase inverter circuit comprising a plurality of switching elements;
a plurality of current sensors each configured to detect a current of a respective phase of the inverter circuit and output a value of the current detected;
a terminal voltage detector configured to detect a voltage of each terminal of a load connected to the inverter circuit and output a value of the voltage detected;
a switching element drive circuit configured to control the plurality of switching elements of the inverter circuit according to a switching pattern given;
a fault detector configured to detect a fault in the inverter circuit or the plurality of current sensors; and
a fault identifier configured to, after the fault detector detects the fault, switch the switching pattern to be given to the switching element drive circuit according to types of faults detectable by the fault detector, and perform fault identification processing of identifying a type and a location of the fault in the inverter circuit or the plurality of current sensors based on the value of the current detected by at least one of the plurality of current sensors or the value of the voltage detected by the terminal voltage detector during the control according to the switching pattern.

2. The power converter according to claim 1, wherein
the fault identifier is configured to give to the switching element drive circuit, as the switching pattern, a first switching pattern for turning off all of the plurality of switching elements, and a second switching pattern for turning on one or more of the plurality of switching elements.

3. The power converter according to claim 2, wherein
the fault detector is configured to detect a fault using a first fault detection method that can detect a short-circuit fault in a switching element with a short-circuit resistance smaller than a predetermined threshold value, among the plurality of switching elements, and
the fault identifier is configured to, after the fault detector detects the fault using the first fault detection method, perform the fault identification processing using the value of the voltage detected during the control according to the first switching pattern.

4. The power converter according to claim 3, wherein
the predetermined threshold value is defined as a short-circuit resistance value of the switching element such that an amount of a through current is equal to or less than a rated current of the switching element, and
the through current flows when a positive electrode and a negative electrode of a power supply of the inverter circuit are short-circuited via upper and lower switching elements of a short-circuit faulty phase.

5. The power converter according to claim 2, wherein
the fault detector is configured to detect a fault using a second fault detection method that can detect an upper and lower limit value stuck fault in the plurality of current sensors, and
the fault identifier is configured to, after the fault detector detects the fault using the second fault detection method, perform the fault identification processing using the value of the current detected during the control according to the first switching pattern.

6. The power converter according to claim 2, wherein
the fault detector is configured to detect a fault using a third fault detection method that can detect a short-circuit fault in a switching element with a short-circuit resistance equal to or larger than a predetermined threshold value, among the plurality of switching elements, and
the fault identifier is configured to, after the fault detector detects the fault using the third fault detection method, perform the fault identification processing using the value of the current detected during the control according to the second switching pattern.

7. The power converter according to claim 6, wherein
the predetermined threshold value is defined as a short-circuit resistance value of the switching element such that an amount of a through current is equal to or less than a rated current of the switching element, and
the through current flows when a positive electrode and a negative electrode of a power supply of the inverter circuit are short-circuited via upper and lower switching elements of a short-circuit faulty phase.

8. The power converter according to claim 2, wherein
the fault detector is configured to detect a fault using a fifth fault detection method that can detect a plurality of types of faults including a short-circuit fault in a switching element with a short-circuit resistance smaller than a predetermined threshold value, among the plurality of switching elements, and
the fault identifier is configured to, after the fault detector detects the fault using the fifth fault detection method, before performing a switching pattern involving an on-operation of one or more of the plurality of switching elements, perform the fault identification processing using the value of the voltage detected during the control according to the first switching pattern.

9. The power converter according to claim 8, wherein
the predetermined threshold value is defined as a short-circuit resistance value of the switching element such that an amount of a through current is equal to or less than a rated current of the switching element, and
the through current flows when a positive electrode and a negative electrode of a power supply of the inverter circuit are short-circuited via upper and lower switching elements of a short-circuit faulty phase.

10. The power converter according to claim 1, wherein
the fault identifier is configured to give to the switching element drive circuit, as the switching pattern, a first switching pattern for turning off all of the plurality of switching elements, a second switching pattern for simultaneously turning on upper or lower switching elements of all phases among the plurality of switching elements, and a third switching pattern for driving one or more of the plurality of switching elements at a frequency higher than a rotation frequency of the load.

11. The power converter according to claim 10, wherein
the fault detector is configured to detect a fault using a fourth fault detection method that can detect a gain abnormality in the plurality of current sensors, and
the fault identifier is configured to, after the fault detector detects the fault using the fourth fault detection method, perform the fault identification processing using the value of the current detected during the control according to the third switching pattern.

12. A control method for a power converter including a multiphase inverter circuit and a plurality of current sensors, the control method comprising:
detecting a current of a respective phase of the inverter circuit and outputting a value of the current detected;
detecting a voltage of each terminal of a load connected to the inverter circuit and outputting a value of the voltage detected;
controlling a plurality of switching elements of the inverter circuit according to a switching pattern given;
detecting a fault in the inverter circuit or the plurality of current sensors; and
after detecting the fault, switching the switching pattern to be given according to types of faults detectable, and fault identification processing of identifying a type and a location of the fault in the inverter circuit or the plurality of current sensors based on the value of the current detected or the value of the voltage detected during the control according to the switching pattern.

13. The control method according to claim 12, wherein
the switching pattern to be given includes a first switching pattern for turning off all of the plurality of switching elements, and a second switching pattern for turning on one or more of the plurality of switching elements.

14. The control method according to claim 13, further comprising:
detecting a fault using a first fault detection method that can detect a short-circuit fault in a switching element with a short-circuit resistance smaller than a predetermined threshold value, among the plurality of switching elements; and
after detecting the fault using the first fault detection method, performing the fault identification processing using the value of the voltage detected during the control according to the first switching pattern.

15. The control method according to claim 14, wherein
the predetermined threshold value is defined as a short-circuit resistance value of the switching element such that an amount of a through current is equal to or less than a rated current of the switching element, and
the through current flows when a positive electrode and a negative electrode of a power supply of the inverter circuit are short-circuited via upper and lower switching elements of a short-circuit faulty phase.

16. The control method according to claim 13, further comprising:
detecting a fault using a second fault detection method that can detect an upper and lower limit value stuck fault in the plurality of current sensors; and
after detecting the fault using the second fault detection method, performing the fault identification processing using the value of the current detected during the control according to the first switching pattern.

17. The control method according to claim 13, further comprising:
detecting a fault using a third fault detection method that can detect a short-circuit fault in a switching element with a short-circuit resistance equal to or larger than a predetermined threshold value, among the plurality of switching elements; and
after detecting the fault using the third fault detection method, performing the fault identification processing using the value of the current detected during the control according to the second switching pattern.

18. The control method according to claim 13, further comprising:
detecting a fault using a fifth fault detection method that can detect a plurality of types of faults including a short-circuit fault in a switching element with a short-circuit resistance smaller than a predetermined threshold value, among the plurality of switching elements; and
after detecting the fault using the fifth fault detection method, before performing a switching pattern involving an on-operation of one or more of the plurality of switching elements, performing the fault identification processing using the value of the voltage detected during the control according to the first switching pattern.

19. The control method according to claim 12, wherein
the switching pattern to be given includes a first switching pattern for turning off all of the plurality of switching elements, a second switching pattern for simultaneously turning on upper or lower switching elements of all phases among the plurality of switching elements, and a third switching pattern for driving one or more of the plurality of switching elements at a frequency higher than a rotation frequency of the load.

20. The control method according to claim 19, further comprising:
   detecting a fault using a fourth fault detection method that can detect a gain abnormality in the plurality of current sensors; and
   after detecting the fault using the fourth fault detection method, performing the fault identification processing using the value of the current detected during the control according to the third switching pattern.

* * * * *